(12) United States Patent
Rogers (10) Patent No.: US 7,632,319 B2
(45) Date of Patent: Dec. 15, 2009

(54) FUEL PRODUCED BY THE TREATMENT OF BROWN GREASE

(75) Inventor: Ralph W. Rogers, Cornelius, NC (US)

(73) Assignee: EcoPlus, Inc., Charlotte, NC (US)

( * ) Notice: Subject to any disclaimer, the term of this patent is extended or adjusted under 35 U.S.C. 154(b) by 0 days.

(21) Appl. No.: 12/110,538

(22) Filed: Apr. 28, 2008

(65) Prior Publication Data

US 2008/0250831 A1      Oct. 16, 2008

Related U.S. Application Data

(62) Division of application No. 11/194,996, filed on Aug. 2, 2005, now Pat. No. 7,384,562.

(60) Provisional application No. 60/623,538, filed on Oct. 29, 2004.

(51) Int. Cl.
*C10L 5/14* (2006.01)

(52) U.S. Cl. .............................. 44/553; 44/589; 44/628; 210/710

(58) Field of Classification Search .................... 44/553
See application file for complete search history.

(56) References Cited

U.S. PATENT DOCUMENTS

| 3,947,602 | A |   | 3/1976 | Clewell, Jr. et al. |
|---|---|---|---|---|
| 3,984,447 | A |   | 10/1976 | Cooper et al. |
| 4,828,577 | A |   | 5/1989 | Markham et al. |
| 4,913,826 | A |   | 4/1990 | Mannig et al. |
| 5,160,444 | A |   | 11/1992 | McFarland |
| 5,207,921 | A |   | 5/1993 | Vincent |
| 5,269,939 | A | * | 12/1993 | Laurent et al. ............... 210/705 |
| 5,374,358 | A |   | 12/1994 | Kaniecki et al. |
| 5,507,954 | A |   | 4/1996 | Carrillo |
| 5,558,686 | A | * | 9/1996 | Lavelle, IV ................... 44/606 |
| 5,560,950 | A |   | 10/1996 | Conte et al. |
| 5,597,600 | A |   | 1/1997 | Munson et al. |
| 5,797,701 | A |   | 8/1998 | Conaway |
| 5,846,409 | A |   | 12/1998 | Zappe |
| 5,928,522 | A |   | 7/1999 | Conaway |
| 6,110,383 | A |   | 8/2000 | Coombs et al. |
| 6,368,648 | B1 |   | 4/2002 | Bertram et al. |
| 6,653,355 | B1 |   | 11/2003 | Kasahara et al. |
| 7,160,470 | B2 |   | 1/2007 | Davis et al. |
| 7,384,562 | B2 | * | 6/2008 | Rogers ........................ 210/708 |

* cited by examiner

*Primary Examiner*—Peter A Hruskoci
(74) *Attorney, Agent, or Firm*—Hammer & Associates, P.C.

(57) ABSTRACT

The invention is a process for treatment of brown grease, where the brown grease comprises water, food solids and free-oil. This process starts with the collection of the brown grease into a container. The brown grease's pH is adjusted with a chemical treatment to produce an adjusted brown grease phase. To the adjusted brown grease phase an anionic copolymer treatment mixture is added along with a cationic copolymer to form a reaction mixture. The reaction mixture reacts for a period of time, and during this time wastewater is discharged from the reaction mixture to produce resulting solids. The resulting solids are then transferred from the container for disposal or are processed further into a fuel or soil additive.

10 Claims, 6 Drawing Sheets

FUEL PRODUCED BY THE TREATMENT OF BROWN GREASE

RELATED CASES

This application claims the priority of the provisional application Ser. No. 60/623,538 filed Oct. 29, 2004. This application is a divisional application of application Ser. No. 11/194,996 filed Aug. 2, 2005, now U.S. Pat. No. 7,384,562.

BACKGROUND OF THE INVENTION

The present invention provides a method for an efficient and sanitary treatment of brown grease.

Grease is a material, either liquid or solid, composed primarily of fats, oils and grease (also referred to as FOG) from animal or vegetable sources. Brown grease (or trap grease) is waste that is recovered from grease traps and interceptors. Yellow grease is oil and grease that comes directly from fryers and other cooking equipment. A grease trap is a small volume device located inside a food service facility, generally under a sink, designed to collect, contain, or remove food wastes and brown grease from the waste stream while allowing the balance of the liquid waste to discharge into the wastewater collection system, usually a sanitary sewer system. A grease interceptor is a large volume device located underground and outside of a food service facility designed to collect, contain or remove food wastes and brown grease from the waste stream while allowing the balance of the liquid waste to discharge to the wastewater collection system, usually a sanitary sewer system. Interceptors have at least one inspection hatch on the top surface to facilitate inspection, cleaning and maintenance by a service provider.

The terms "grease trap" and "grease interceptor" are often used interchangeably in the literature. For this document, discussion of any "grease separation device" refers to both types of units without need for differentiation. For this document, FOG refers to Brown Grease unless otherwise noted.

A problem today is that the nature of FOG is changing and this change is leading to problems in the effective treatment of FOG. While once largely composed of animal fats (such as lard), now fats, oils, and grease (FOG) the waste grease and oils that are discharged from kitchen drains into sanitary sewer systems are now principally manufactured vegetable oils designed to adhere to food. The basic chemical structure of FOG is varying combinations of glycerol ($C_3H_8O_3$) and fatty acids (chains of carbon-hydrogen with a carboxylic group—COOH—attached). However, as food science advances, and cooking oils become more and more efficient, the fatty acid chains become much more complex. Unlike the older, animal fat-based cooking media, the more complex fatty acids are by and large more stable, and they are less likely to break down either in the sanitary drain system, from the activity of naturally occurring bacteria, or from general exposure in the open environment.

Both animal fats and vegetable oils are 8-12 percent lighter than water and do not mix with it. FOG forms a floating layer on the water in the grease separation devices, and that property enables those lighter materials to be efficiently removed, essentially by vacuuming out the floating fats and as much of the water as regulations require.

The increased development of central business districts encircled by suburban areas, the increasing mobility of our society, and increased restaurant patronage per capital per year have led to significant growth in the commercial food sector. These trends have led to the increase of commercial areas containing high densities of restaurants, mall food courts, and supermarket ready-to-eat meals. Additionally, many other new food preparation facilities such as sports arenas, strip shopping centers, convenience stores and carry-out kiosks have raised the numbers of high-loading grease sources on municipal sewer systems. With more restaurants, institutional kitchens, and other commercial, food handling venues, the nation's sewer systems experience increasing difficulty with grease clogged sewer lines and pumping stations affecting sewage treatment operations.

A major area of problems is between the source of the FOG and the treatment plant. Drainage pipes within buildings are usually made from metals or plastics. Municipal sewer piping may be made from metals, plastics or ceramic materials such as terra cotta. All of these materials are hydrophobic and oleophilic. Hydrophobic means water does not stick to the material, a good property for water-handling pipes. Oleophilic means oily substances are naturally attracted to the material, which is why piping encounters grease clogging.

Fats and oils naturally stick to piping walls. However, fats and oils also possess an inherent surface "stickiness" (increasingly an engineered property to enhance cooking properties), which leads to sewage-borne solids sticking to the grease layer on a sewer pipe's inside walls, slowly and relentlessly reducing the pipe's transfer capacity. This frequently leads to a pipe becoming so clogged that the effluent in the line emerges through a manhole (or burst pipe) to the surface as a sanitary sewer overflow (SSO). Not only is this a health hazard, but local governments can be, and are, fined by the EPA for such spills. Additionally, the remedy for the clogged mains, physically cleaning the pipe systems, is expensive, messy, and dangerous work.

For these reasons, regulators from the EPA at the federal level to state, county, and municipal governments have increasingly implemented policies and regulations to control the influx of FOG into the public wastewater systems. The most common and generally preferred methods of FOG entrapment is either a grease trap (for small establishments) or grease interceptors (for mainline, higher volume establishments). These regulations generally specify sizing criteria and frequently mandate grease removal (i.e. service call) frequency.

In addition to companies that provide extraction of interceptor contents as their service there are an array of products that are purported to clean and maintain grease interceptors. However, these existing products related to cleaning and maintaining grease interceptors have some drawbacks to their use.

The first of these products are enzymes. Basically, an enzyme is a protein that will act on a compound and break it into several smaller compounds. Enzymes are compound specific; in fact, there are enzymes that will work only on the compounds found in FOG. Although the actual enzymatic action is quite complex, the end result is that the fatty acids are severed from the glycerol base. This allows the FOG to dissolve and move downstream. However, enzyme reactions are all reversible chemical reactions. The free fatty acids can re-join the glycerol base and become FOG, complete with the same characteristics it once had. While enzymes may dissolve FOG and facilitate its dispersal from the grease interceptor, (and this may be beneficial to the restaurant owner in that the grease interceptor may not need to be pumped as frequently) the FOG problem is just displaced. It will reappear as the fatty acids and glycerol recombine in a sewer or in a pump station's wet well downstream. Thus the disposal problem is simply transferred to the public sector. In addition, enzymes do not replicate themselves. They will be carried out along with the dissolved grease. As a result, enzymes must be frequently introduced into the grease interceptor, representing an ongoing maintenance issue for management.

The second of these products are detergents. Detergents are not an effective treatment option. They may clean blockages from the restaurant's lines, but create other problems for a sewer system and its wastewater treatment plant. In a similar fashion to enzymes, they break up grease deposits, but the grease can re-congeal further downstream in the collection system.

The third of these products are bacteria and solvents. Using bacteria to consume sewer grease is effective only when the proper microorganisms are used and applied through a highly developed service system. Bacteria products commonly sold with "do-it-all" claims typically give grease interceptor owners a false sense of security. Bacteria are pH and temperature sensitive and do not maintain their replicating activity particularly well in the (low pH) environment found in grease interceptors. Also, their use is generally not well received by (publicly owned treatment works (POTWs).

Finally, many distributors of biological liquefiers, enzymes, and other such products claim that their products will eliminate the need to pump a grease interceptor ever again. Some of the products that claim to be bacterial products are actually inactive forms of bacteria packed in solvents such as kerosene, toluene, terpene, surfactants, etc. It is actually the solvent, not the bacteria, which dissolves the grease. This defeats the purpose of a grease interceptor. The product may move FOG out of the food processor's grease interceptor, but the grease can quickly recongeal in the POTW's collection system. In summary, these alternatives are not a solution and many sanitary system operators do not condone their use.

Disposal options in the realms of bio-diesel fuel manufacture and bio-fuel (heating fuels and turbine feeds for example) are interesting research projects but are generally experimental or limited in scope, and exhibit increased costs compared to petroleum based fuel. A 2% mix of bio-diesel with conventional diesel adds about three cents per gallon at the pump and trucking organizations are resistant to mandated use of these mixes. In any case, yellow grease, not brown grease, is the preferred feedstock for bio-fuels. Brown grease has, however, been the subject of specific research for its use as a feedstock for bio-diesel fuel manufacture. Much of the work has been done at the university level, though at least one large rendering company has a functioning production plant, Griffin Industries, Inc., Cincinnati, Ohio, that may use a small amount of brown grease in its feed. Several issues, however, indicate that brown grease will be very slow to catch on as a large-scale feedstock.

Bio-diesel feedstock demands low free fatty acid content. Brown grease contains 5-times (or more) free fatty acids (FFAs) as soy oil (or other low FFA oils that are processed with alkaline catalysts into bio-fuels) so must be blended with low FFA components to make bio-diesel feed.

The large scale alternative for brown grease processing is a relatively complex acid catalyst process demanding high-energy drying and high temperature processing at high pressures, demanding acid resistant steels and other specialized handing equipment.

New EPA directions towards 100% pumping rules mean that the brown grease requires separation from massive amounts of water, and exceedingly low water content in the feed product is a requirement for processing; slightly too much water and the alkaline catalyst procedure for bio-diesel production produces a soap contaminate in the bio-fuel. Eliminating water is energy intensive, thus low water "yellow grease" or virgin vegetable oils are highly preferred as feedstock.

Research on effective brown grease utilization has not translated into effective large-scale operations. The issue of disposal of contaminants entrained in the grease-sludge waste from bio-diesel production still remains.

SUMMARY OF THE INVENTION

The invention is a process for treatment of brown grease, where the brown grease comprises water, food solids and free-oil. This process starts with the collection of the brown grease into a container. The brown grease's pH is adjusted with a chemical treatment to produce an adjusted brown grease phase. To the adjusted brown grease phase an anionic copolymer treatment mixture is added along with a cationic copolymer to form a reaction mixture. The reaction mixture reacts for a period of time, and during this time wastewater is discharged from the reaction mixture to produce resulting solids. The resulting solids are then transferred from the container for disposal or is processed further into a fuel or soil additive.

BRIEF DESCRIPTION OF THE DRAWINGS

The foregoing will become more readily apparent by referring to the following detailed description and the appended drawings in which.

DETAILED DESCRIPTION OF THE INVENTION

Figure 6:
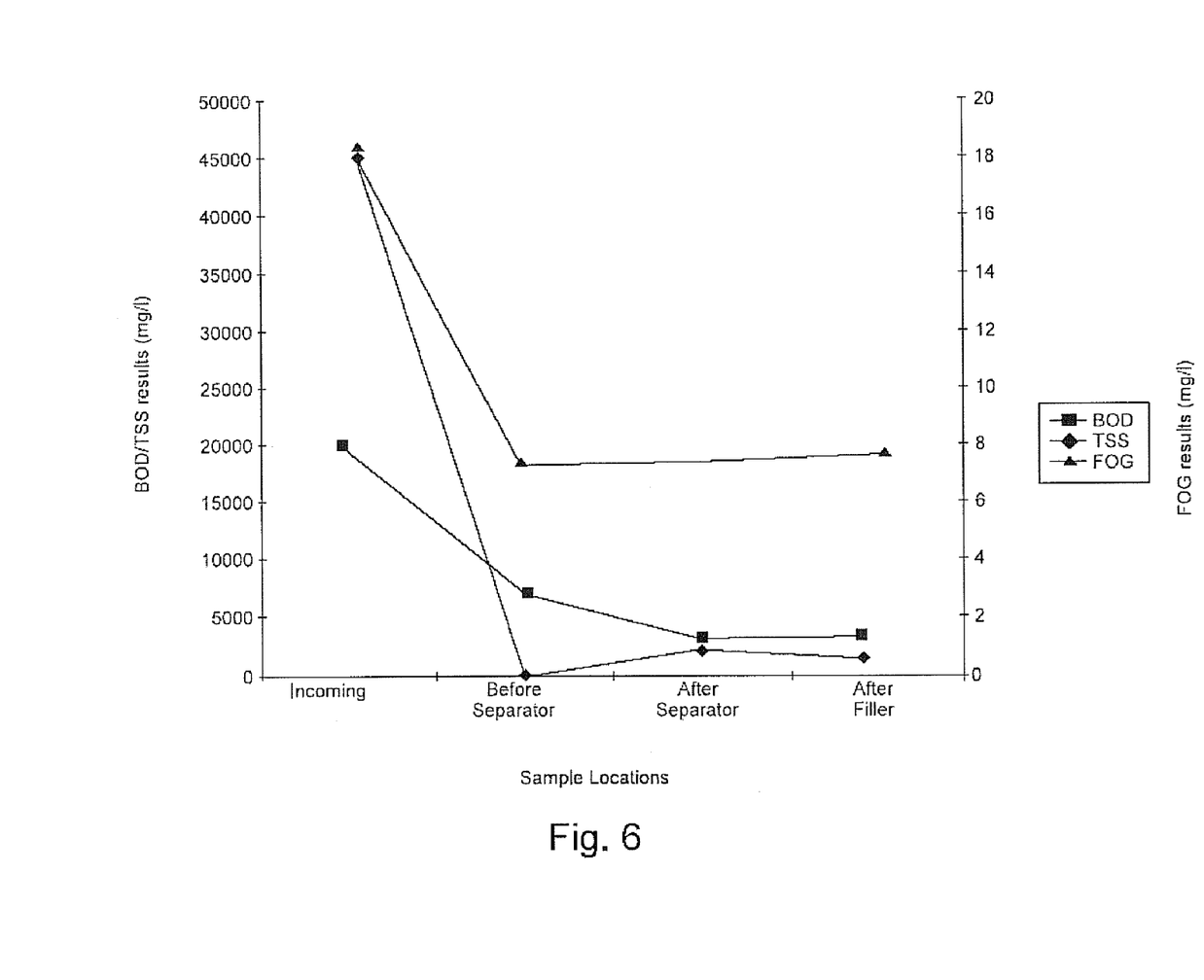
FIG. 6 is graph of the effluent test without an oxidizing agent.

The invention is a process for treatment of brown grease, where the brown grease comprises water, food solids and free-oil. This process starts with the collection of the brown grease into a container 10, FIG. 1. The brown grease's pH is adjusted with a pH chemical treatment 15 to produce an adjusted brown grease phase. To the adjusted brown grease phase an anionic copolymer treatment mixture 20 is added along with a cationic copolymer 25 to form a reaction mixture. The reaction mixture reacts for a period of time and during this time wastewater is discharged from the reaction mixture to produce resulting solids. The resulting solids are then transferred from the container 10 to a storage container 30 for disposal or is processed further into a fuel or soil additive. Optionally with this process food solids can be separated from the water and free-oil at a separator 50. The effectiveness of this process is shown in the graph of FIG. 6, where FOG is fats oils and grease, BOD is the biochemical oxygen demand, and TSS is the total suspended solids.

Figure 1:
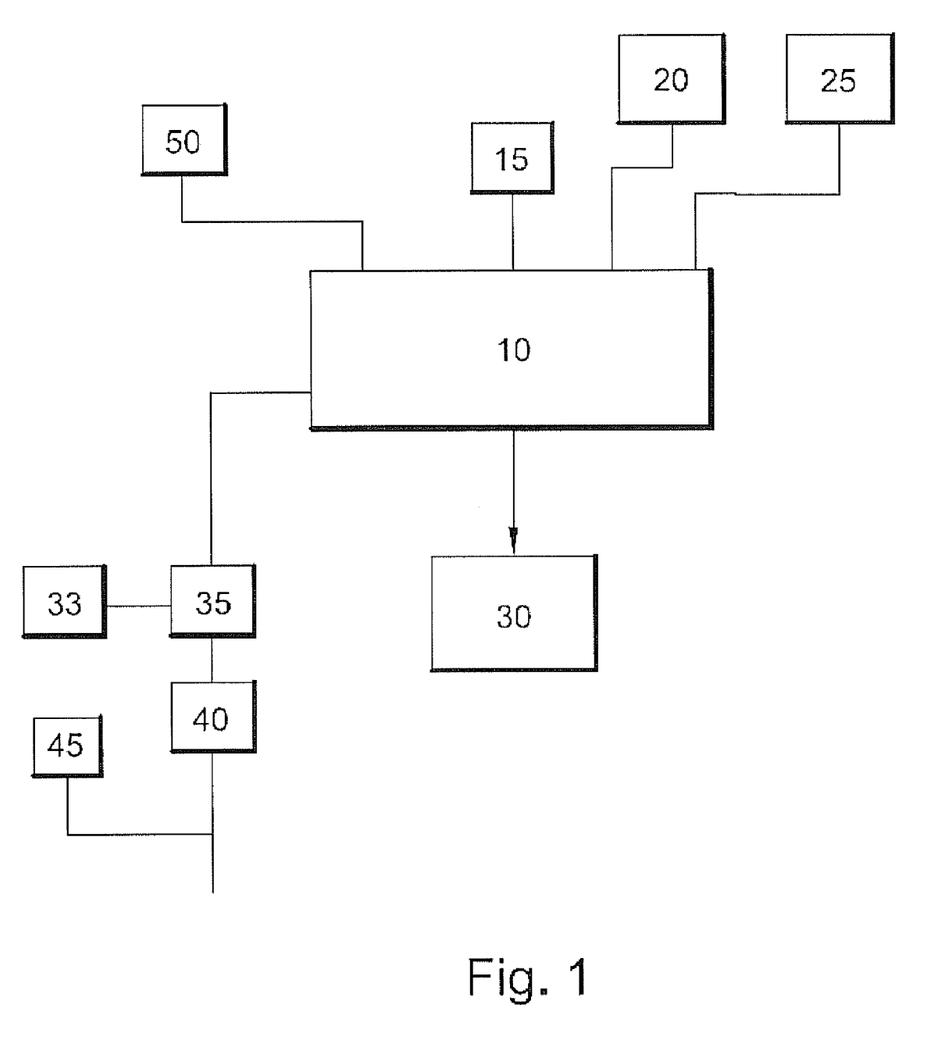
FIG. 1 is a schematic of the process in accordance with the invention.

In the invented process for treatment of brown grease, FIG. 1, the anionic copolymer treatment mixture 20 can be any anionic copolymer salt capable of reacting with a cationic copolymer salt and, which is capable of producing a resulting solid. The anionic copolymer 20 may be selected from the group of: water-soluble polymers (especially the natural and semisynthetic polymers), polyethylene glycol copolymer salts, polyglycerol ester copolymer salts, carboxymethylcellulose copolymer salts, methylcellulose copolymer salts, ethylcellulose copolymer salts, arabic gum copolymer salts and acrylamide copolymer salts. It has been found that a mixture of an anionic acrylamide copolymer salt and water works well. The cationic copolymer treatment 25 can be any cationic copolymer salt capable of reacting with an anionic copolymer salt and, which is capable of producing a resulting solid. The cationic copolymer 25 may be selected from the group of: water-soluble polymers (especially the natural and semisynthetic polymers), polyethylene imine copolymer salts, polyethylene glycol copolymer salts, polyglycerol ester copolymer salts, carboxymethylcellulose copolymer salts, methylcellulose copolymer salts, ethylcellulose copolymer salts, arabic gum copolymer salts and acrylamide copolymer salts. It has been found that a mixture of a cationic acrylamide copolymer salt and water works well.

In one embodiment, the cationic copolymer treatment 25 mixture is a mixture of a cationic acrylamide copolymer salt and water. In one embodiment the anionic copolymer treatment mixture is a mixture of from 0.025 to 9% anionic acrylamide copolymer salt to water. In one embodiment the cationic copolymer treatment mixture is a mixture of from 0.025% to 9% cationic acrylamide copolymer salt to water.

Figure 5:
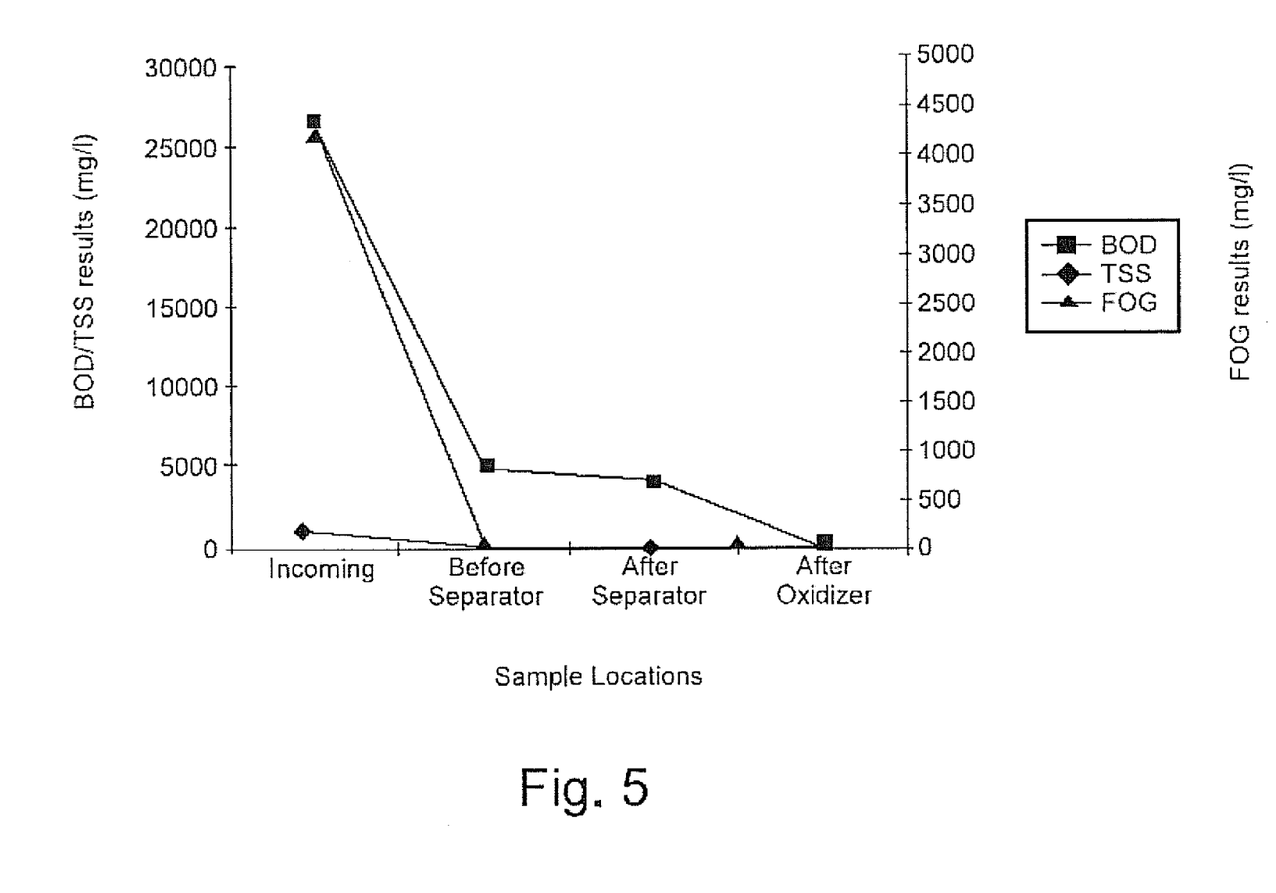
FIG. 5 is a graph of the effluent test with an oxidizing agent.

This invented process for treatment of brown grease may further comprise the steps of separating of the free-oil and food solids from the water in the container. The water is drained off from the container 10, leaving the free oil food solids. Then the water drained from the container 10 is collected into a reservoir 35. The pH of the collected water in reservoir 35 is measured. The pH may be adjusted as required for meeting discharge limits, if this is required then a pH adjuster 33 is added. Generally the water coming off container 10 tends to be basic having a pH of 10 or more. When the water is discharge to sanitary sewer it is preferable that the water be in the pH range of 7-9 in reservoir 35. The pH adjuster used in 33 would need to be on the acidic side to bring down the pH of the basic water coming off container 10. The water from reservoir 35 is then filtered through a sand filter 40 to produce filtered water. Then a second chemical treatment for water 45 is added to the filtered water. This second chemical treatment is an oxidizing agent. The oxidizing agent can be any oxidizing agent, though it has been found that hydrogen peroxide works well in this application. The effectiveness of this addition of an oxidizing agent, such as hydrogen peroxide, is shown in the graph of FIG. 5, where FOG is fats oils and grease, BOD is the biochemical oxygen demand, and TSS is the total suspended solids. In one of the embodiments of this invention, the second chemical treatment is added before the sand filter as shown by the broken line in FIG. 2.

Figure 2:
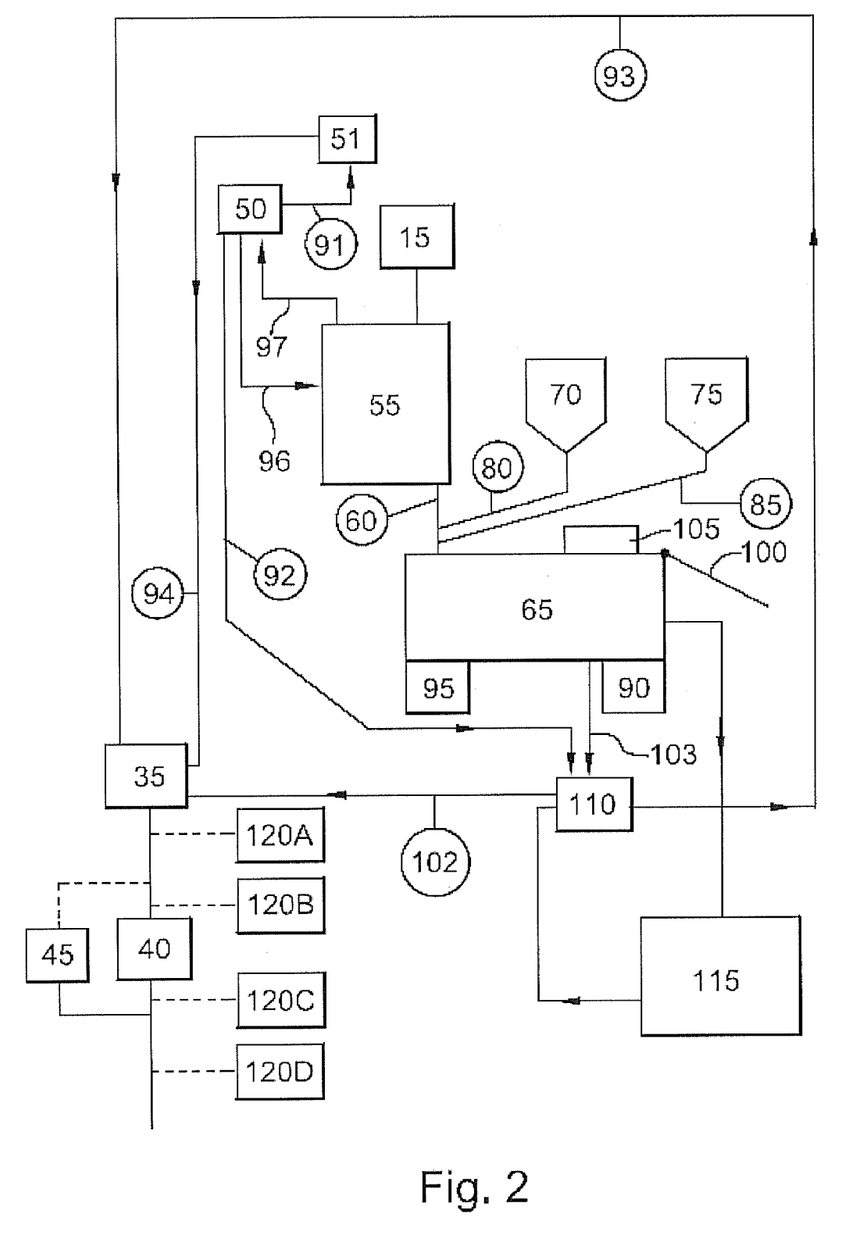
FIG. 2 is a schematic of the main process in accordance with the invention.

The invented process for treatment of brown grease may further comprise in another embodiment the steps of separating of the free-oil and food solids from the water at the separator 50, FIG. 2. The water that is drained off flows through the piping 91 and into an initial water collection reservoir 51 or can alternately be pumped through piping 92 to the storage pit 110. The water which is initially removed from the free-oil and food solids as a pH in the acid range, generally from a pH of 3 to 4, and can be used later to help adjust the pH of the discharged water. The free-oil and food solids and some residual water is then sent to the mixing tank 55.

In one of the embodiments of the invented process for treatment of brown grease, the brown grease is a mixture of brown grease and debris. In this case a separator 50 can be provided and would be used to separate debris from the brown grease prior to collection in the container 10. The separator may be a screen where the size of the mesh is determined by the type of debris mixed in with the brown grease.

In the invented process for treatment of brown grease the pH chemical treatment 15 is a base. While many bases can be used in this application, it has been found that either a lime slurry or calcium hydroxide work well in this application.

In one embodiment of the invented process for treatment of brown grease the adjustment of pH can be facilitated by having a separate mixing tank 55, FIG. 2. This mixing tank has a mixing tank discharge pipe 60. The free-oil phase is transferred to the mixing tank 55, where the free-oil in the mixing tank is mixed and pH is adjusted with the pH treatment chemical 15 to produce an adjusted oil phase. The mixing tank 55 may have a means for agitation such as an impeller or cavitator. Mixing may also be facilitated by a circulation loop 96, 97 between the separator 50 and mixing tank 55.

The reaction of the adjusted oil phase with the anionic copolymer treatment mixture 20 and the cationic copolymer treatment mixture 25 can be facilitated by having a separate mixing box 65, FIG. 2. An anionic mixing unit 70 has a means of agitation and is provided with an anionic mixing unit discharge pipe 80 in communication with the mixing tank discharge pipe 60. This anionic mixing unit 70 is provided with a mixture of water and an anionic copolymer. The water and the anionic copolymer are mixed in the anionic mixing unit 70 to produce an anionic copolymer treatment mixture. A cationic mixing unit 75 having a means of agitation is provided, which also has a cationic mixing unit discharge pipe 85 in communication with the mixing tank discharge pipe 60. This cationic mixing unit 75 is provided with a mixture of water and a cationic copolymer. The water and the cationic copolymer are mixed in the cationic mixing unit 75 to produce a cationic copolymer treatment mixture. Upon transfer of the adjusted oil phase from a mixing tank 55 the anionic copolymer treatment mixture is mixed in with the adjusted oil either: just before introduction into the mixing box 65; or after introduction into the mixing box 65. The cationic copolymer treatment mixture is then added to the mixture of adjusted oil and anionic copolymer mixture to form a reaction mixture. The mixing box 65 is filled with a predetermined amount of the reaction mixture. The reaction mixture is allowed to react for a period of time, that time being a reaction time. It should be noted that while it is described above to add in the anionic copolymer treatment 20 is added to the brown grease first the process can be reversed. If reversed then the cationic copolymer treatment 25 would be added to the brown grease first and subsequently the anionic polymer treatment would be added to form the reaction mixture.

Figure 4:
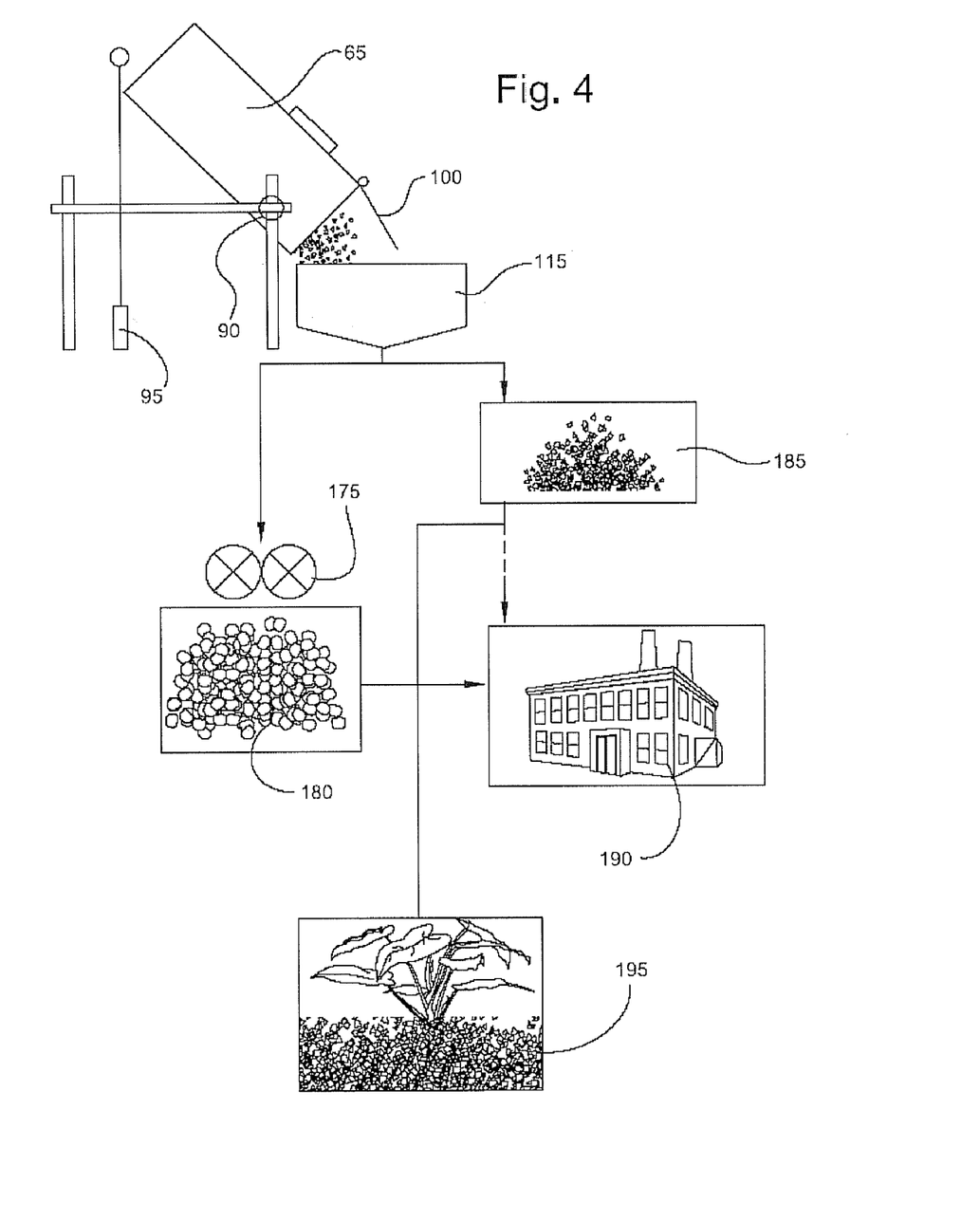
FIG. 4 a schematic of the finishing process in accordance with the invention.

The mixing box 65 serves two functions, first it provides a place for the reaction to take place and second, during the reaction the reaction mixture is dewatered. These mixing boxes 65 can be rectangular and made from any material that is inert to reaction process. It has been found that welded steel works well in this application. These mixing boxes 65 are hinged 90 to tilt on actuators 95, with hinged doors 100, on the ends that allow the processed mass to be expelled by gravity following dewatering. The hinged doors may be top hinged as shown in FIGS. 4 and 2 or hinged lower on the box face. Hatches 105 to the top allow of ingress and egress for servicing issues. The reaction in the mixing boxes is exothermic and may reach elevated temperatures. These elevated temperatures are often several degrees higher than ambient temperature and can be as high as 80° F. or 26.7° C. or more. The process for a batch size of three to five thousand gallons takes place over 3 to 5 hours.

In one embodiment of the invented process for treatment of brown grease, wastewater from the reaction box is drained off during the reaction process. The wastewater, or supernatant liquid, drains by gravity through line 103. This water can be collected in a storage pit 110 and from there pumped to the reservoir 35. Once the reaction is complete the resulting solids from the mixing box 65, FIG. 4, are transferred to a storage container 115 where it is either transferred for disposal or is processed further into a fuel or soil additive. The solids from the process are dumped by gravity from the mixing box 65 by tilting the mixing box 65 on the actuators 95 and hinges 90 to transfer the high density solids into the storage containers 115. The high density solids may also be transfer by scooping the contents out of the mixing box 65 or by some similar transfer means. These storage containers 115 may be 20 cubic yard "roll off" boxes, or other appropriate containers or transfer equipment. When sufficient solids accumulate, they are either shipped to a permitted landfill, or can be further dried and processed to use as recycled material for fuel or an additive for agricultural purposes. These dried high density solids may optionally be sent to briquette rollers 175, FIG. 4, to be molded into a compressed dried high density solids of various shapes 180. The dried high density solids may also be used without further processing 185. The dried high density solids may be sent unprocessed 185 or in briquette form 180 to be used as fuel for process heat 190 or it may be used in unprocessed form 185 as an additive for agricultural purposes 195. During the standing time in the roll off boxes 115, FIG. 2, water continues to flash off the material, and this is collected through drains into the storage pit 110 and is subsequently pumped to the water reservoir 35.

Generally the water coming off the mixing boxes 65 or the roll off boxes 115 tends to be basic, having a pH of 10 or more. When the water is discharge to sanitary sewer from reservoir 35 it is preferable that the water be in the pH range of 7-9. The pH can be adjusted using the low pH water from initial reservoir 51 or if storage pit 110 has some low pH water that could alternatively be used. The addition of this low pH water is used to bring down the pH of the basic water from reservoir 35. The water in reservoir 35 is adjusted for pH to be between 7 and 9, as measured by litmus paper or a pH meter. Then reservoir 35 contents are then discharged through a sand filter 40, whose entrained solids are disposed of periodically into a roll off box 115.

The invented system can optionally use a final filter 120, FIG. 2 which can be located at positions A, B, C or D. It has been found that a 10 micron filter works well as the final filter 120. It has also been found that if the final filter 10 is placed in location A, it helps prevent the sand filter 40 from becoming clogged. This final filter 120 is easily cleaned periodically.

With the final filter 120 being used in the A position, then a sand filter 40 and before the effluent passes thru a flume (with a flow meter, or other flow measuring system, to record discharge volumes) a nominal amount of an oxidizing agent from chemical treatment 45, such as hydrogen peroxide solution, is pumped into the discharge stream for adjustment to the Biochemical Oxygen Demand (BOD). This nominal oxidizing agent solution can range from 25 to 75% concentration by volume. It has been found that in one embodiment a 40-55% concentration by volume, nominal hydrogen peroxide solution works well. The oxidizing agent injection rate is adjusted to meet discharge limits imposed by the sewage authorities and can varied to compensate for a wide spectrum of discharge limits. The discharge then goes to a sanitary sewer tap.

Figure 3:
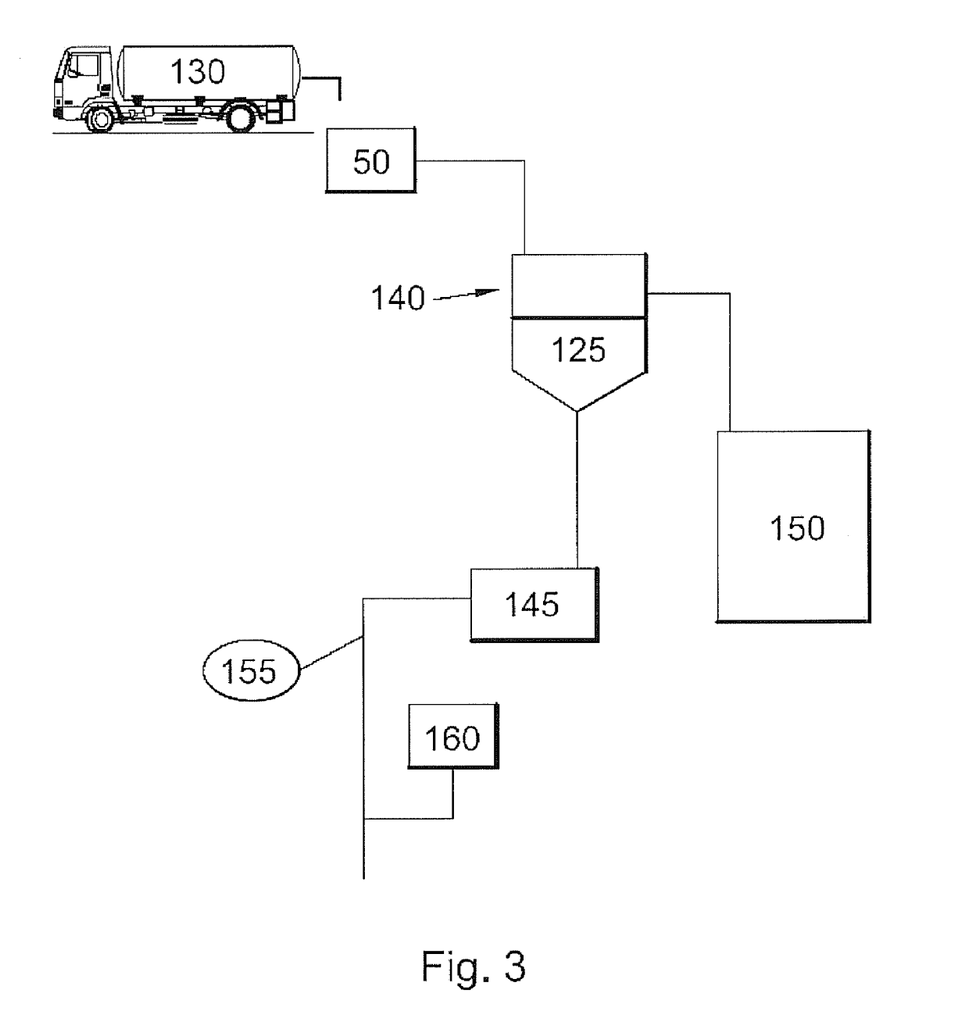
FIG. 3 is a schematic of the decant process in accordance with the invention.

In one embodiment of the invented process for treatment of brown grease, a decant offload tank 130 is provided, FIG. 3.

Brown grease is collected into the decant offload tank 130, where the brown grease comprises water, food solids and free-oil. A separation tank 140 and a separator 50 are provided. The brown grease from said decant offload tank 130 is passed through the separator 50 and into the separation tank 140. The free-oil and food solids are separated from the water in the separation tank 140 to form an oil phase. The water from the separation tank is drained off to create discharge water and the oil phase discharge. An oil phase storage unit 150 is provided. The oil phase discharge is transferred to the oil phase storage unit 150. A water discharge storage unit 145 is provided. The discharge water 125 is transferred to the water discharge storage unit 145 which has a discharge line 155. The discharge water in the water discharge storage unit 145 may be adjusted for pH with virtually any base acceptable to the sewage authorities. A means for dispensing chemicals 160 is provided which is in communication with the discharge line. The means for dispensing chemicals 160 has a water discharge chemical treatment. The water discharge chemical treatment is added from chemical dispenser 160 to the discharge line to produce treated water. Generally this dispensed chemical is an oxidizing agent. However, the treatment may also include adjustment to the pH. The treated water is then discharged. Residual solids that may accumulate in tank 40 are periodically collected and disposed of, generally to a landfill.

The oil phase discharge is transferred from the oil phase storage unit 150, FIG. 3, to the separator 50, FIG. 2, and then to the mixing tank 55, having a mixing tank discharge pipe 60 is provided. As described before, the mixing tank 55 may include means for agitation or have a circular loop between the separator 50 and the mixing tank 55 to aid in the blending. Then the pH of the oil phase is adjusted in the mixing tank 55 with the pH chemical treatment 15 to produce an adjusted oil phase. An anionic mixing unit 70 is provided which has a means of agitation and has an anionic mixing unit discharge pipe 80 in communication with the mixing tank discharge pipe 60. This anionic mixing unit holds a mixture of water and an anionic copolymer. The water and the copolymer are mixed in the mixing unit to produce a copolymer treatment mixture. A mixing box 65 in communication with said mixing tank discharge pipe is provided. The adjusted oil phase is discharged into the mixing tank discharge pipe 60. The copolymer treatment mix is discharged into said mixing tank discharge pipe 60. A cationic mixing unit 75 is provided which has a means of agitation and has a cationic mixing unit discharge pipe 85 in communication with the mixing tank discharge pipe 60. The discharge pipe of the cationic mixing unit 85 is located at the end closest to the mixing box 65. The cationic mixing unit 75 holds a mixture of water and a cationic copolymer which forms a cationic copolymer mixture. The cationic copolymer mixture is added at the end of the mixing tank discharge pipe 60 to produce a reaction mixture. The mixing box 65 is filled with a predetermined amount of the reaction mixture. The reaction mixture is reacted for a period of time. Wastewater from the mixing box 65 is discharged to a wastewater storage unit 110 which produces the resulting solids. The resulting solids are transferred from the mixing box 65 to a storage container 115 where it is either transferred for disposal or is processed further into a fuel or soil additive.

In one embodiment of the invented process for treatment of brown grease, a sand filter 40 is provided which is in communication with the discharge line before the means for dispensing water treatment chemicals 45. The discharge water is fed through the sand filter to produce a filtered water before adding the chemical treatment for water. Optionally a final filter 120 can be located in the A, C or D position.

In one embodiment of the invented process for treatment of brown grease, a sand filter 40 is provided which is in communication with the discharge line after the means for dispensing the chemical treatment for water 45, FIG. 2, shown by dotted line from chemical treatment means 45. The treated water is fed through the sand filter 40 to produce a filtered water before discharge. Optionally this filtered water may also be passed through a final filter 120 located in the A, B or C position.

In one embodiment of the invention the additions of the cationic copolymer and anionic copolymer is reversed.

What is claimed is:

1. A fuel produced by a process comprising the steps of:
    collecting a brown grease into a container, where said brown grease comprises water, food solids and free-oil;
    adjusting pH of said brown grease with a first chemical treatment to produce an adjusted brown grease phase, where said first chemical treatment is a base;
    adding an ionic copolymer treatment mixture;
    adding an ionic copolymer of an opposite charge to form a reaction mixture;
    reacting said reaction mixture for a period of time;
    discharging wastewater from said reaction mixture to produce a resulting solids; and
    drying said resulting solids to form the fuel.

2. The fuel according to claim 1 where in the step of collecting a brown grease into a container, where said brown grease comprises water, food solids and free-oil further comprises the steps of:
    separating free-oil and food solids from water in said container;
    draining off water from said container;
    collecting water drained from said container; and
    filtering collected water through a filter to produce filtered water.

3. The fuel according to claim 1 where said process further comprises the steps of:
    providing a separator;
    separating debris from said brown grease prior to collection in said container.

4. The fuel according to claim 1 where said process further comprises the steps of:
    providing a mixing tank having a mixing tank discharge pipe in communication with said container;
    transferring said brown grease to said mixing tank;
    mixing said brown grease in said mixing tank;
    adjusting pH of said brown grease in said mixing tank with said first chemical treatment to produce an adjusted brown grease phase; and
    transferring said adjusted brown grease phase to said container through said mixing tank discharge pipe.

5. The fuel according to claim 4 where said process further comprises the steps of:
    providing an anionic mixing unit having a means of agitation and having a mixing unit discharge pipe in communication with said mixing tank discharge pipe, said mixing unit having a mixture of water and an anionic copolymer;
    mixing said water said anionic copolymer in said mixing unit to produce a copolymer treatment mixture;
    discharging said adjusted brown grease phase into said mixing tank discharge pipe; and
    discharging said copolymer treatment mix into said mixing tank discharge pipe.

6. The fuel according to claim 5 where said process further comprises the steps of:
    providing a cationic mixing unit having a means of agitation and having a cationic mixing unit discharge pipe in communication with said mixing tank discharge pipe at the end closest to said container, said cationic mixing unit having a mixture of water and an cationic copolymer being a cationic copolymer mixture;
    adding said cationic copolymer mixture at an end of said mixing tank discharge pipe to produce a reaction mixture;
    filling said container with a predetermined amount of said reaction mixture; and
    reacting said reaction mixture for a period of time, that time being a reaction time.

7. The fuel according to claim 6 where said process further comprises the steps of:
    running off wastewater from said container to a wastewater storage unit.

8. The fuel according to claim 1 where said process further comprises the steps of:
    briquetting said resulting solids.

9. A fuel comprising:
    a dried reaction mixture of dewatered pH adjusted brown grease, wherein the pH adjuster is a base;
    an water-soluble anionic copolymer selected from the group consisting of: polyethylene glycol copolymer salts, polyglycerol ester copolymer salts, carboxymethylcellulose copolymer salts, methylcellulose copolymer salts, ethylcellulose copolymer salts, arabic gum copolymer salts and acrylamide copolymer salts; and
    a water-soluble cationic copolymer selected from the group consisting of: polymers, polyethylene imine copolymer salts, polyethylene glycol copolymer salts, polyglycerol ester copolymer salts, carboxymethylcellulose copolymer salts, methylcellulose copolymer salts, ethylcellulose copolymer salts, arabic gum copolymer salts and acrylamide copolymer salts.

10. The fuel according to claim 9 where said base being either a lime slurry or a calcium hydroxide.

* * * * *